(12) United States Patent
Bauer et al.

(10) Patent No.: US 7,948,779 B2
(45) Date of Patent: May 24, 2011

(54) CONVERTER WITH REDUCED HARMONIC WAVES

(75) Inventors: Franz Bauer, Herzogenaurach (DE); Christoph Brunotte, Erlangen (DE); Klemens Kahlen, Nürnberg (DE); Hans Tischmacher, Lauf (DE)

(73) Assignee: Siemens Aktiengesellschaft, München (DE)

( * ) Notice: Subject to any disclaimer, the term of this patent is extended or adjusted under 35 U.S.C. 154(b) by 98 days.

(21) Appl. No.: 12/440,103

(22) PCT Filed: Aug. 17, 2007

(86) PCT No.: PCT/EP2007/058564
§ 371 (c)(1),
(2), (4) Date: Mar. 5, 2009

(87) PCT Pub. No.: WO2008/028794
PCT Pub. Date: Mar. 13, 2008

(65) Prior Publication Data
US 2010/0027302 A1    Feb. 4, 2010

(30) Foreign Application Priority Data
Sep. 8, 2006  (DE) .......................... 10 2006 042 384

(51) Int. Cl.
*H02M 1/12*    (2006.01)
(52) U.S. Cl. ........................................... 363/41
(58) Field of Classification Search .................. 363/41, 363/40, 131
See application file for complete search history.

(56) References Cited

U.S. PATENT DOCUMENTS
5,909,362 A * 6/1999 Adams ..................... 363/21.03
6,208,537 B1    3/2001 Buchholz et al.

FOREIGN PATENT DOCUMENTS

| CN | 21 85 487 Y | 12/1994 |
|---|---|---|
| DE | 10323218 A1 | 12/2004 |
| EP | 0829948 A2 | 3/1998 |
| EP | 1035642 A1 | 9/2000 |
| JP | 10164847 A | 6/1998 |
| WO | WO 0076056 A1 | 12/2000 |

OTHER PUBLICATIONS

Skudelny, H.C.; V.D. Broeck, H.W.; Stanke, G.V.: "Analysis and Realization of a Pulsewidth Modulator Based on Voltage Space Vectors" IEEE Transactions of Industry Applications, Bd.24, No. 1, 1988, Seiten 142-150, XP002464397; Others; 1988.

* cited by examiner

*Primary Examiner* — Shawn Riley
(74) *Attorney, Agent, or Firm* — Henry M. Feiereisen; Ursula B. Day

(57) ABSTRACT

Converter and method for controlling a converter with power semiconductor switches, having a filter (1) which is connected to the power semiconductor switches and having a drive circuit (4) which is connected to the power semiconductor switches for the purpose of modulation, wherein, as a result of the modulation, a fundamental at a fundamental frequency (fGS) is generated in a passband (P) of the filter (1), modulation products are generated in a first frequency band (FB1), in a second frequency band (FB2) and in an intermediate frequency band (ZFB) which is formed between the first frequency band (FB1) and the second frequency band (FB2), the modulation products in the intermediate frequency band (ZFB) are reduced in comparison with the modulation products in the first frequency band (FB1) and the modulation products in the second frequency band (FB2); and the intermediate frequency band (ZFB) is generated, in a resonant range (R) of a resonant frequency (fres) of the filter (1), between the passband (P) and an attenuation range (D) of the filter (1). A converter having an output-side sinusoidal filter whose dimensions have been reduced is thus obtained.

10 Claims, 5 Drawing Sheets

CONVERTER WITH REDUCED HARMONIC WAVES

BACKGROUND OF THE INVENTION

The invention relates to a converter and a method for controlling a converter.

High-speed synchronous machines require feed frequencies of 1000 Hz or higher, even in two-pole design. Feeding units used in this case include for example voltage-impressing, two- or three-phase pulse-controlled inverters, which can operate according to the subharmonic method, for example.

In the case of space vector modulation or else in the case of types of modulation with a triangular carrier signal (subharmonic method), the voltages provided contain, alongside the desired fundamental, harmonics having the frequencies $$f_a = \mu f_{switch} \pm \eta f_{GS}.$$

In this case, $f_{GS}$ is the frequency of the fundamental, $f_{switch}$ is the pulse frequency, and $\mu$, $\eta$ are integral, positive ordinal numbers. The components in the output voltage having the frequencies $f_a$ which arise in addition to the fundamental on account of the modulation are referred to as modulation products.

As a result of the higher frequency components of the voltages in the range of the pulse frequency and above, higher-frequency components likewise occur in the conductor currents. These distortion currents brought about by higher frequency components generate additional Joule heat and core losses in the machine.

The literature, for example EP 1035642 A1, describes numerous methods which make it possible, in the case of variable-speed drives, to reduce the harmonic currents or to avoid low-frequency components. In the modulation methods, by way of example, individual switches in the inverter are not switched for specific angle ranges of the fundamental (flat-top modulation) and the average switching losses that arise are lower than if each switch is operated at pulse frequency.

A different method works with optimized pulse patterns. In this case, the harmonic behavior is influenced directly, e.g. by eliminating specific voltage harmonics or minimizing the square harmonic current route-mean-square value. This is done by iteratively determining from the Fourier coefficients of the inverter output voltage, taking account of the pulse number and the modulation factor, switching angles for a pulse pattern with quarter-cycle symmetry which lead to the elimination of the desired harmonics.

A further possibility for keeping the distortion currents small is forwarded by the three-point inverter for the same intermediate circuit voltage $U_Z$. With said inverter, in contrast to the two-point inverter, a three-stage modulation can be carried out, with the result that during a half-cycle of the fundamental frequency, the output voltage can assume not just two ($U_Z$, 0; $-U_Z$, 0) but three different voltage values ($U_Z$, $U_Z/2$, 0; $-U_Z$, $-U_Z/2$, 0).

In the case of high-speed drives having a constant rotational speed, i.e. constant fundamental frequency and constant pulse frequency, filters, e.g. series resonant circuits, are used for reducing the modulation products.

DE 103 23 218 A1 discloses a high-voltage converter whose output is connected to a medium-frequency transformer. A converter connected downstream of the medium-frequency transformer comprises, in DE 103 23 218 A1, an input power converter, a DC voltage intermediate circuit and a pulse-controlled inverter. Likewise, DE 103 23 218 A1 explains a method for driving the high-voltage converter.

Pulse-controlled converters with a filter are used in many applications. This concerns, in particular, arrangements with feedback capability for feeding a DC voltage intermediate circuit for instance from a three-phase power supply or else arrangements for feeding a rotating-field machine such as e.g. an asynchronous motor or else a synchronous motor with separate excitation or permanent-field excitation. The sinusoidal filters are used for example in order that the winding loading of the motor or else the EMC influencing (EMC-electromagnetic compatibility) is kept small.

Filters can have a pronounced resonance at a resonant frequency. Frequencies below the resonant frequency can pass through the filter. Above the resonant frequency, the voltage components are attenuated more or less depending on distance from the resonant frequency.

A strong magnification is effected in the range of resonance. The magnification is dependent on the attenuation of the filter. In general, the filters are only weakly attenuated since the losses in the filter rise with the attenuation. The weaker the attenuation, however, the greater the resonance magnification. Therefore, it is necessary to minimize any excitation in the range of the resonance magnification. The filter is designed by the choice of the resonant frequency of the filter in such a way that the fundamental lies in the passband (that is to say below the resonant frequency) of the filter. Modulation products in the converter voltage lie exclusively above the resonant frequency and are thus filtered out. The resonant frequency therefore lies above the fundamental and below the modulation products excited by the modulation. Correspondingly large coils and capacitors are used for said resonant frequency.

SUMMARY OF THE INVENTION

The invention is based on the object of specifying a converter and a method for controlling the converter, wherein the intention is to reduce the dimensions of a sinusoidal filter of the converter as far as possible.

According to one aspect of the invention, the object is achieved by a method for controlling a converter comprising power semiconductor switches, a filter connected to the power semiconductor switches, and a drive circuit, which is connected to the power semiconductor switches for the purpose of modulation, wherein, as a result of the modulation, a fundamental having a fundamental frequency is generated in a passband of the filter, modulation products are generated in a first frequency band, in a second frequency band and in an intermediate frequency band formed between the first frequency band and the second frequency band, the modulation products in the intermediate frequency band are reduced by comparison with the modulation products in the first frequency band and the modulation products in the second frequency band, and the intermediate frequency band is generated in a resonance range of a resonant frequency of the filter between the passband and an attenuation range of the filter.

According to one aspect of the invention, the object is achieved by a converter which includes power semiconductor switches, a drive circuit which is connected to power semiconductor switches for the purpose of modulation and, as a result of the modulation, generates modulation products in a first frequency band, in a second frequency band and in an intermediate frequency band formed between the first frequency band and the second frequency band, the modulation products in the intermediate frequency band being reduced by comparison with the modulation products in the first frequency band and the modulation products in the second frequency band, and a filter connected to the power semiconductor switches, which filter has a resonance range, a passband for a fundamental generated by the drive circuit, and an attenuation range, the resonance range being formed in the range of the intermediate frequency band.

Accordingly, a converter is provided. A converter can be embodied for example as a 2-point, 3-point or multilevel inverter. A converter can be for example a high-voltage converter for supplying current to rail vehicles. Furthermore, the converter can be used for supplying current to stationary devices from a high-voltage power supply. By way of example, the converter can be part of a so-called HVDCT system (High Voltage Direct Current Transmission).

The converter according to the invention has a number of preferably turn-off power semiconductor switches. Such turn-off power semiconductors are for example a GTO (Gate Turn-Off thyristor), an IGCT (Integrated Gate Commutated Thyristor), an IGBT (Insulated-Gate Bipolar Transistor), or an HV-MOSFET (high-voltage field effect transistor).

Furthermore, the converter has a drive circuit, which is connected to the power semiconductor switches for the purpose of modulation. In this case, the drive circuit can be embodied in analogue and/or digital fashion. The drive circuit is embodied and set up for functions of the converter and can for example be constructed from electronic individual components or else be integrated in a number of semiconductor chips. By way of example, an electric motor can be controlled in a variable manner by altering the modulation.

For this purpose, the power semiconductor switches are driven correspondingly for the modulation.

For this purpose, the modulation generates a useful signal having a fundamental, which signal can be sinusoidal for example for a three-phase rotating-field machine. Furthermore, the modulation generates modulation products having a characteristic spectrum in particular as a result of the switching mode of operation of the power semiconductor switches.

The modulation products are generated in a first frequency band, in a second frequency band and in an intermediate frequency band formed between the first frequency band and the second frequency band. In this case, the modulation products in the intermediate frequency band are reduced by comparison with the modulation products in the first frequency band and the modulation products in the second frequency band by means of a corresponding embodiment of the modulation. In this case, the reduction is preferably a factor of 10 or greater.

A filter, for example a sinusoidal filter, is connected downstream of the power semiconductor switches. By way of example, the filter is connected between the power semiconductor switches of an inverter and an electric motor in order to filter out signal components, such that the latter do not reach the electric motor. The filter can likewise be connected between an inverter and a feeding three-phase power supply.

The filter has a resonance range around a resonant frequency of the filter, a passband for the fundamental generated by the drive circuit, and an attenuation range. In particular, the resonance range has a resonance magnification governed by an only low attenuation of the filter. By way of example, the filter is a second-order LC low-pass filter.

The resonance range is formed in the range of the intermediate frequency band. By way of example, modulation products in the first frequency band, which concerns frequencies below the intermediate frequency band, pass through the filter in the passband. By contrast, modulation products in the second frequency band are filtered out by the filter in the attenuation range.

In accordance with one advantageous configuration, the drive circuit is designed for application of a space vector modulation or a pulse pattern modulation with optimized pulse patterns. Preferably, the drive circuit is designed both for a space vector modulation and for application of optimized pulse patterns of a pulse pattern modulation and can change between these types of modulation, for example. In this case, it is preferably provided that the drive circuit is designed for changing over between space vector modulation and pulse pattern modulation in a manner dependent on a modulation factor and/or the fundamental frequency. By way of example, the drive circuit changes over from the space vector modulation to the pulse pattern modulation upon a modulation factor of 0.45 being reached (relative to a full block).

The filter advantageously has a low-pass filter characteristic. The low-pass filter is preferably not attenuated by an additional resistance and advantageously embodied as a second-order LC low-pass filter. In this case, the inductance of the LC low-pass filter typically also has a resistive impedance component.

In accordance with one advantageous configuration, the converter has a rectifier, an intermediate circuit connected to the rectifier, and an inverter connected to the intermediate circuit and the filter. The inverter in turn has the power semiconductor switches, which are connected via the filter and the terminals thereof to an electromotive drive. Another advantageous configuration provides for the filter to be connected between the inverter and a feeding three-phase power supply.

In order to achieve the method object, a method for controlling a converter is provided. The converter is designed for modulation of a motor current and/or of a motor voltage. As a result of the modulation, a fundamental is generated in a passband of the filter. During the modulation, modulation products arise in a first frequency band, in a second frequency band and in an intermediate frequency band formed between the first frequency band and the second frequency band.

In this case, the modulation is effected in such a way that the modulation products in the intermediate frequency band are reduced by comparison with the modulation products in the first frequency band and the modulation products in the second frequency band. In this case, the first frequency band can comprise lower frequencies than the intermediate frequency band and the second frequency band can comprise higher frequencies than the intermediate frequency band.

The modulation is effected in such a way that the intermediate frequency band is generated in a resonance range of a resonance of the filter between the passband and an attenuation range of the filter. On account of the reduced modulation products in the intermediate frequency band, these products do not have a functionally disturbing effect on the converter in the range of the resonance magnification. Preferably, a space vector modulation and/or a pulse pattern modulation is effected as the modulation.

In accordance with one preferred development, it is provided in this case that a changeover is made between the space vector modulation and the pulse pattern modulation in a manner dependent on a modulation factor and/or the fundamental frequency. Advantageously, a changeover is made between the space vector modulation and the pulse pattern modulation in the case of a modulation factor of 0.3 to 0.5.

In one advantageous development, it is provided that the modulation is effected by different pulse patterns in a manner dependent on the modulation factor and/or the fundamental frequency. Preferably, in this case, in a manner dependent on the modulation factor and/or the fundamental frequency, provision is made of a number of modulation factor ranges and/or a number of fundamental frequency ranges which are in each case assigned to an optimized pulse pattern. Between the ranges, a changeover is made in a manner dependent on the modulation factor and/or the fundamental frequency between the different pulse patterns. In this case, it is preferably provided that each pulse pattern generates the intermediate frequency band with reduced modulation products in the resonance range of the filter.

BRIEF DESCRIPTION OF THE DRAWING

The invention is explained in more detail below on the basis of exemplary embodiments with reference to drawings.
In this case.

DETAILED DESCRIPTION OF PREFERRED EMBODIMENTS

Figure 1:
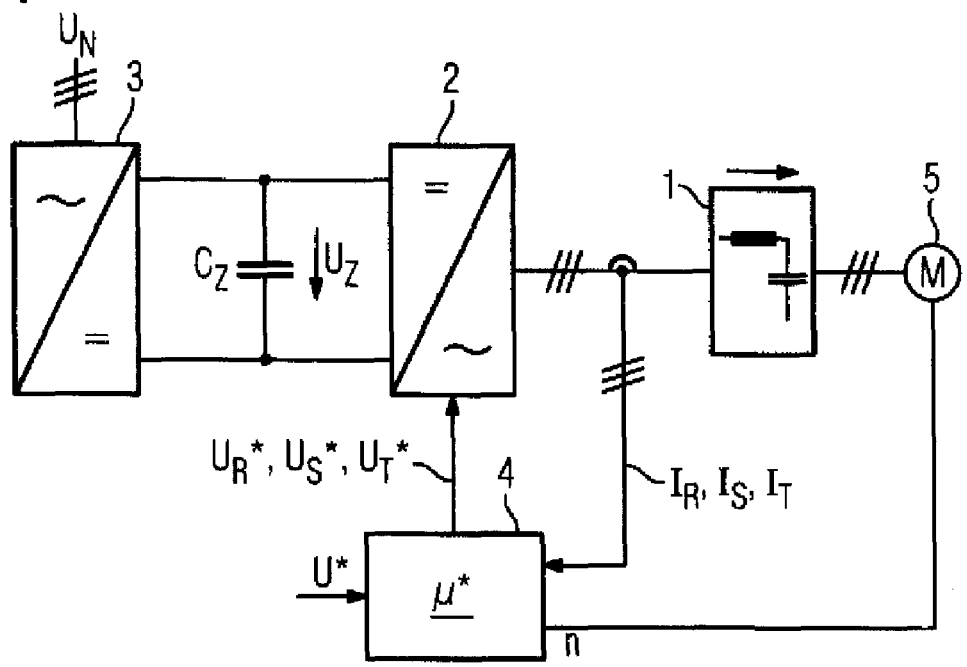
FIG. 1 shows a schematic block diagram of a converter with a filter.

FIG. 1 illustrates a schematic block diagram of a converter. The converter is connected to a power supply having the power supply voltage $U_N$. The converter has a rectifier 3, which is connected to the power supply and which rectifies the AC voltage $U_N$ of the power supply and outputs it to an intermediate circuit having an intermediate circuit voltage $U_Z$. The intermediate circuit voltage $U_Z$ is smoothed by a capacitor $C_Z$. A three-phase inverter 2 is furthermore connected to the intermediate circuit, and generates motor voltages from the intermediate circuit voltage $U_Z$. The inverter is therefore connected to the electric motor 5 via a filter 1.

Furthermore, an analogue and/or digital control unit 4 is provided, which controls the inverter 2 for generating the route-mean-square AC voltages $U_R^*$, $U_S^*$ and $U_T^*$ for the electric motor. In addition to a control signal U*, the control unit 4 can likewise process measurement signals such as a rotational speed n or route-mean-square AC currents $I_R$, $I_S$ or $I_T$. The number of lines for the individual phases is indicated in each case by the number of strokes on the line for this exemplary embodiment.

A modulation is used for generating the route-mean-square AC voltages $U_R^*$, $U_S^*$ and $U_T^*$, said modulation being effected by the control unit 4 by driving power semiconductor switches of the inverter 2. For this purpose, the control unit 4 switches the power semiconductor switches with a constant or variable switching frequency with pulses produced by a space vector modulation or pulse pattern modulation. In this case, the invention is not restricted to the purely exemplary construction of a converter in accordance with FIG. 1, but rather is merely is preferably used with this construction.

Figure 2:
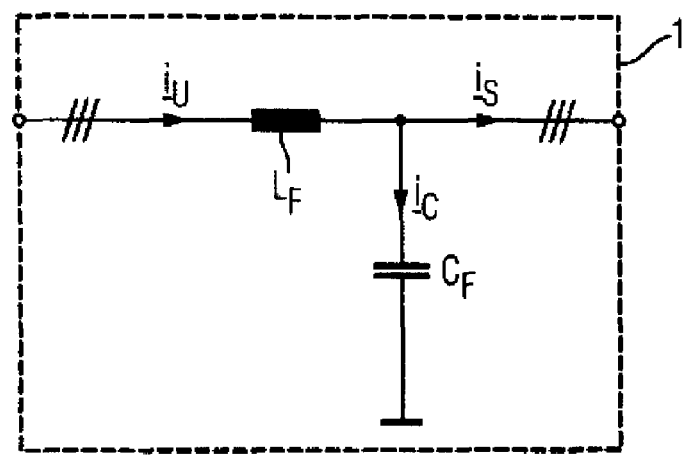
FIG. 2 shows a circuit diagram of a filter.

An exemplary embodiment of a filter 1 is illustrated in FIG. 2 as a second-order low-pass filter, by virtue of a filter capacitor $C_F$ being connected to a filter coil $L_F$. A transfer characteristic (output signal amplitude with respect to input signal amplitude $U_a/U_e$) of such a low-pass filter is illustrated in a diagram in FIG. 3. The sinusoidal filter 1 used has a pronounced resonant frequency $f_{res}$. Signals having frequencies below the resonant frequency $f_{res}$ in a passband P can pass through the sinusoidal filter 1, whereas signals for frequencies above the resonant frequency $f_{res}$ in an attenuation range D are increasingly attenuated with increasing distance from the resonant frequency $f_{res}$.

In a resonance range R around the resonant frequency $f_{res}$, a signal magnification is effected on account of the low attenuation of the filter 1. Preferably, any excitation in the resonance range R is avoided in this case. The resonance range R for resonance magnification has a certain bandwidth dependent on the filter. The design of the filter 1 and here particularly the choice of the resonant frequency $f_{res}$ are effected such that the (frequency-variable) fundamental frequency $f_{GS}$ lies in the passband P, that is to say below the resonant frequency $f_{res}$. By contrast, as many interference frequencies as possible are intended to be in the attenuation range D.

The type of modulation is crucial for the spectrum of the modulation products which is generated at the converter output. In this case, the space vector modulation can be used and/or offline optimized pulse patterns can be used.

Figure 4:
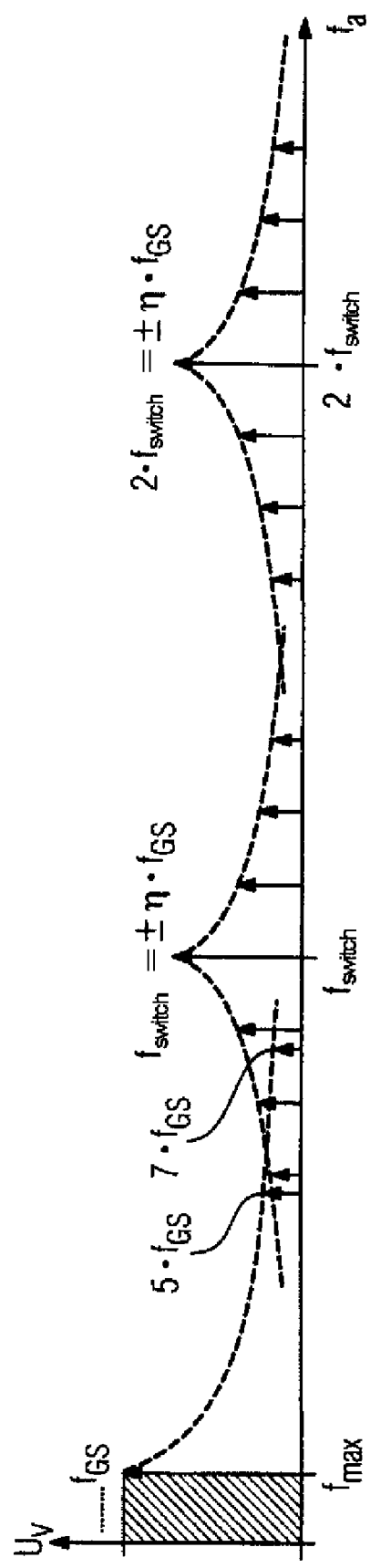
FIG. 4 shows a schematic illustration of a frequency spectrum of a space vector modulation.

FIG. 4 shows so-called modulation products which arise as a result of a space vector modulation. The space vector modulation is preferably used in the case of small modulation factors a. In the case of small modulation factors a, the fundamental frequency $f_{GS}$ is likewise small.

The magnitude of the individual modulation products substantially depends on the modulation factor a. The output voltages contain, for a given fundamental frequency $f_{GS}$, side harmonics around multiples of the switching frequency $f_{switch}$—called pulse frequency hereinafter. This is illustrated by way of example in FIG. 4 only for the pulse frequency $f_{switch}$ and the doubled pulse frequency $2 \cdot f_{switch}$. On account of the relationship $$f_a = \mu f_{switch} \pm \eta f_{GS}$$

the side harmonics furthermore arise in a manner dependent on the fundamental frequency $f_{GS}$. Side harmonics of the fundamental can furthermore occur. Multiples of the fundamental (5th, 7th, 11th, 13th, . . . ) occur for example in the overdriving range of the space vector modulation. By way of example, the 5th and 7th side harmonics are illustrated for the maximum fundamental frequency $f_{max}$. However, the illustrated amplitudes $u_v$ of the modulation products are depicted only for elucidation purposes in FIG. 4, and rarely correspond to reality. The pulse frequency $2 \cdot f_{switch}$ in the case of a three-point inverter, for example, usually has no significant amplitude in the case of small modulations.

Figure 5:
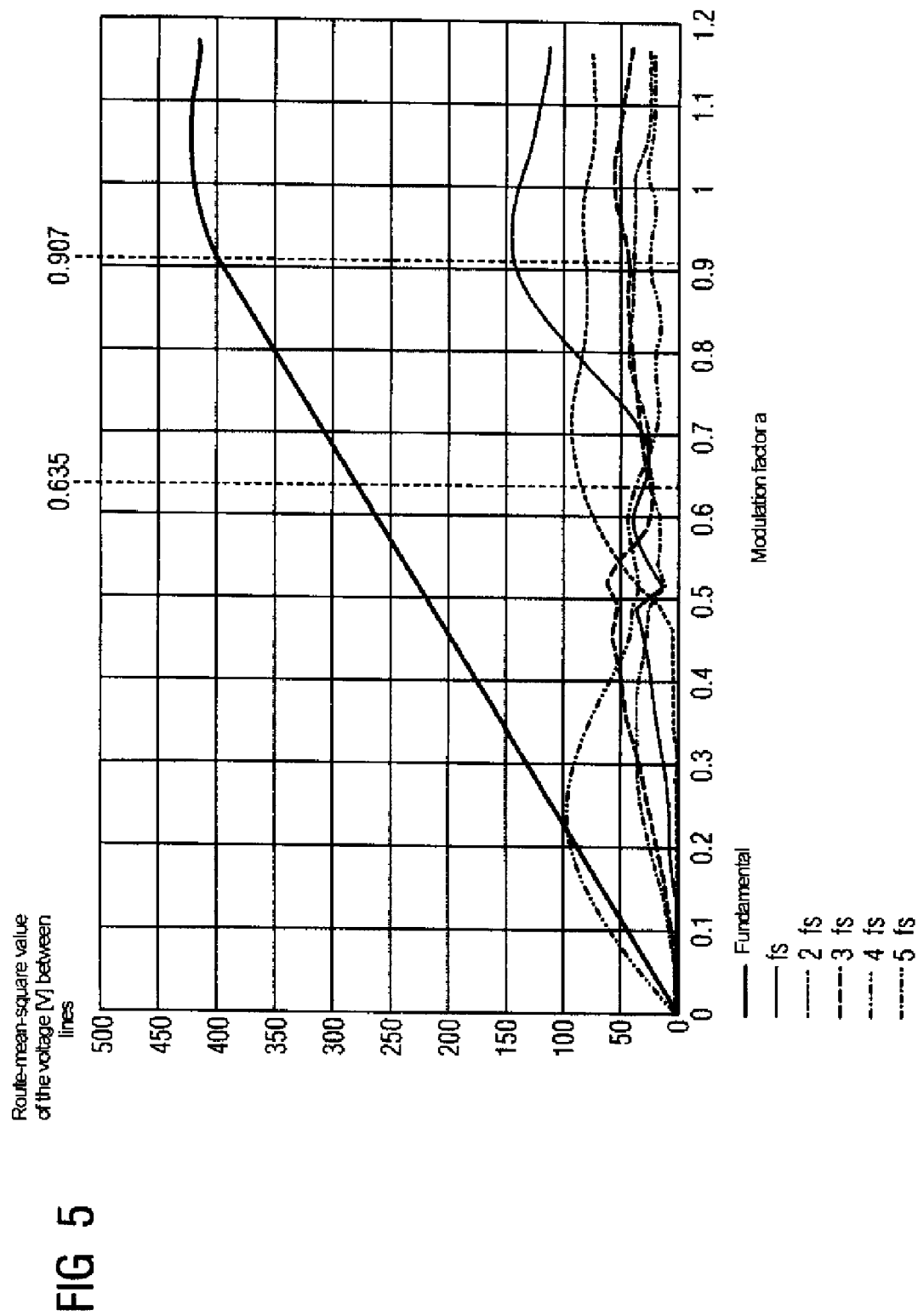
FIG. 5 shows a schematic diagram with amplitudes of modulation products as a function of the modulation factor.

Calculation data of the modulation products are illustrated for three-point inverter technology in FIG. 5. In this case, the illustration shows, combined in groups, the sum of the amplitudes of all the side harmonics for the one-fold pulse frequency fs, the two-fold pulse frequency 2fs, the three-fold pulse frequency 3fs, the four-fold pulse frequency 4fs and the five-fold pulse frequency 5fs for a space vector modulation of a three-point inverter. The amplitude of the fundamental is likewise illustrated for comparison. The profile of all the sums of the amplitudes is illustrated graphically in relation to a modulator factor a.

In this case, it is evident that up to approximately the modulation factor of a=0.45, the sum of the amplitudes of the side harmonics with respect to the two-fold pulse frequency 2fs is very small. It is particularly advantageous here that the one-fold pulse frequency $f_{switch}$ and the three-fold pulse frequency $3 f_{switch}$ are far apart from one another, such that in the resonance range R there are only small harmonics and, as a result, the excitation of the filter 1 is small.

Consequently, one part of the spectrum passes through the sinusoidal filter 1—here the one-fold pulse frequency $f_{switch}$ and the side harmonics thereof—and another part is filtered out by the filter 1 (3 $f_{switch}$, 4 $f_{switch}$ . . . ).

Figure 3:
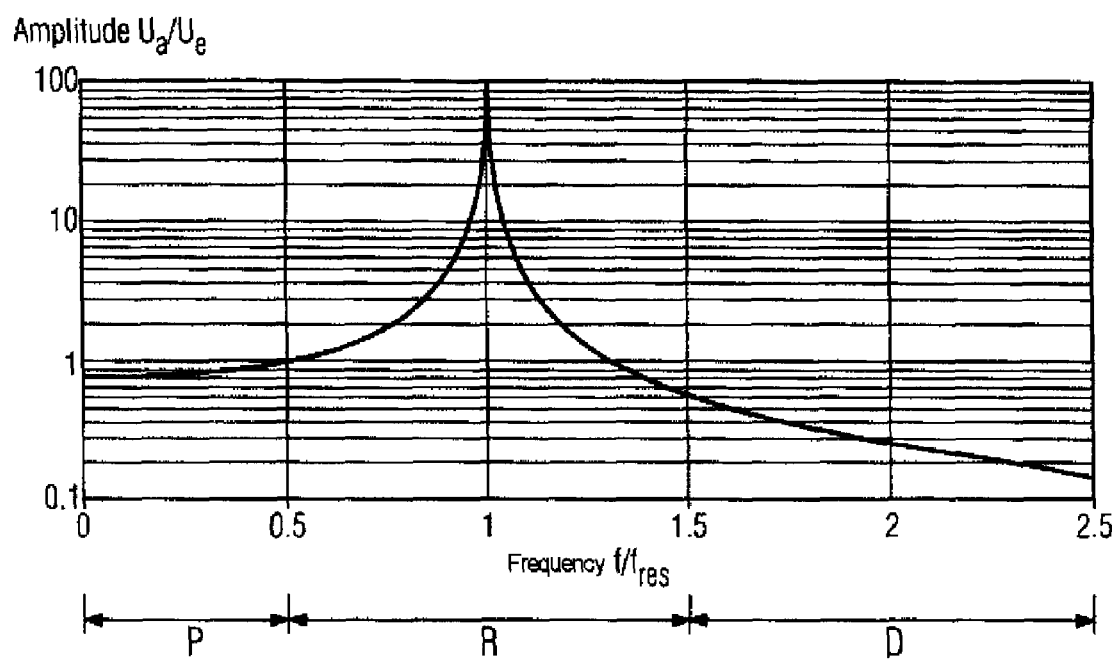
FIG. 3 shows a graphical illustration of a transfer function of a filter.

For this exemplary embodiment, the resonance range R of the filter 1 in accordance with FIGS. 2 and 3 is therefore coordinated with the space vector modulation in such a way that the resonance range R is formed in an intermediate frequency band in the range of the two-fold pulse frequency 2fs. In this case, a first frequency band in the range of the one-fold pulse frequency fs is formed in the passband P of the filter 1. A second frequency band begins in the range of the three-fold pulse frequency 3fs, encompasses all further multiples of the pulse frequency and is therefore formed in the attenuation range D of the filter 1.

The advantages afforded as a result of this are that a small switching frequency can be chosen, such that switching losses in the power semiconductor switches are reduced. At the same time, a filter can be made small and light since a smaller coil inductance $L_F$ is sufficient on account of the higher resonant frequency $f_{res}$. The attendant weight and space saving enables the converter to be produced particularly cost-effectively. At the same time, the voltage drop of the fundamental at the filter inductor $L_F$ is small, such that a smaller attenuation by the inductive component of the inductor $L_F$ occurs as far as the motor and the effectiveness of the converter is increased, such that an increased breakdown torque of the electric motor is obtained. What is additionally achieved is that the capacitive fundamental current in the filter capacitor $C_F$ is small, thereby reducing the risk of over-excitation that could already be attained at relatively low rotational speeds.

As an alternative to the previous exemplary embodiment, particularly in the case of two-point inverter technology, the resonant frequency $f_{res}$ could also be chosen as $f_{switch} \ll f_{res} \ll 2\, f_{switch}$ or else as $2\, f_{switch} \ll f_{res} \ll 3\, f_{switch}$.

The space vector modulation is exclusively used in a first embodiment variant. By contrast, a pulse pattern modulation is exclusively provided in a second embodiment variant.

Particularly in the case of larger modulation factors or fundamentals, offline optimized pulse patterns of a pulse pattern modulation are advantageously used. Application of optimized pulse patterns gives rise to odd-numbered multiples of the fundamental frequency $f_{GS}$ that are indivisible by three. By applying optimization criteria, the pulse patterns can be determined in such a way that specific harmonics are not contained in the modulation products.

Figure 6A:
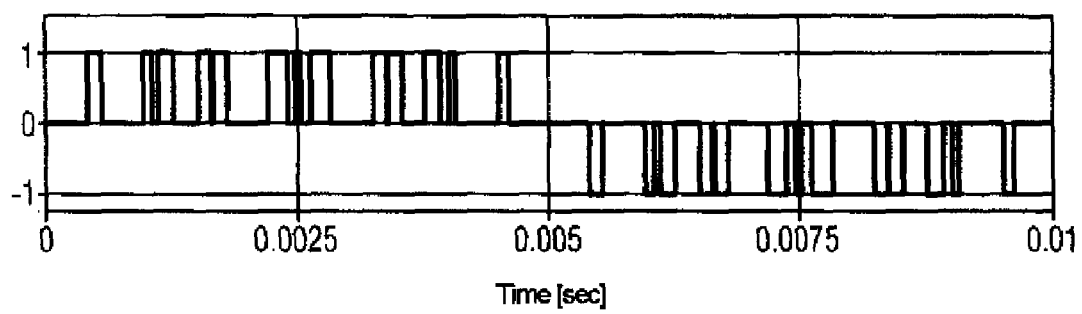
FIG. 6a shows a schematic illustration of a pulse pattern of a pulse pattern modulation.
Figure 6B:
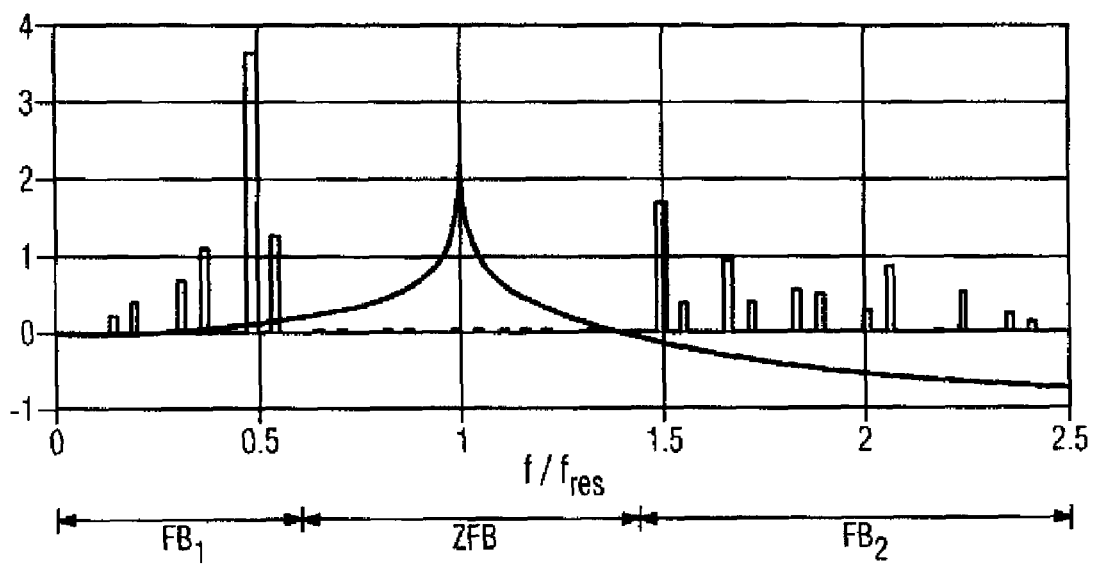
FIG. 6b shows a schematic illustration of a frequency spectrum of a pulse pattern modulation.

A pulse pattern of a pulse pattern modulation is illustrated by way of example in FIG. 6a. The associated FIG. 6b shows that the pulse pattern is coordinated by corresponding optimization criteria in such a way that only very small amplitudes of the modulation products occur in the resonance range R of the filter resonant frequency $f_{res}$. Accordingly, the pulse pattern modulation also has an intermediate frequency band ZFB in which the modulation products are significantly reduced by comparison with a first, lower-frequency frequency band $FB_1$ and a second, higher-frequency frequency band $FB_2$, said intermediate frequency band ZFB being coordinated with the resonance range R. Therefore, harmonics are permitted in the first frequency band $FB_1$ and in the second frequency band $FB_2$, that is to say above and below the resonance range R.

It goes without saying that optimized pulse patterns of a pulse pattern modulation can also be used in the case of small modulation factors or in the case of smaller fundamentals. If the pulse frequency $f_{switch}$ is kept approximately constant for a high current quality, the pulse number P rises and therefore so does the scope of the tables.

The intermediate frequency band ZFB which can be kept free of harmonics of the modulation products by corresponding optimization is substantially dependent on the available pulse frequency $f_{switch}$. For a given fundamental frequency $f_{GS}$, the intermediate frequency band ZFB kept free can be determined from:

$$P \approx f_{switch}/f_{GS}$$

Application of optimized pulse patterns gives rise to odd-numbered multiples of the fundamental that are indivisible by three as harmonics in the output spectrum as modulation products:

$$u_a = \sum_v u_v \text{ with } v = 6 \cdot \pm 1; n = 1, 2 \ldots$$

With P switching angles per quarter period, in principle there are P degrees of freedom in the optimization, in which case one degree of freedom has to be used for the fundamental frequency $f_{GS}$. With the degrees of freedom that have remained it is then possible to "remove" P−1 harmonics from the spectrum by optimization. This corresponds approximately to the frequency band:

$$f_{GS} \cdot [6 \cdot (P-1) \pm 1]/2 \approx 3 \cdot P \cdot f_{GS} = 3 \cdot f_{switch}$$

Since solutions are not always found, it is practical to estimate the intermediate frequency band ZFB which can essentially be kept free of modulation products as $2 \cdot f_{switch}$. FIGS. 6a and 6b show by way of example a branch voltage of an output of the inverter 2 and the frequency spectrum with the modulation products for a three-point inverter for an optimized pulse pattern for P=15, $f_{GS}$=20 Hz, a=0.4 and $f_{res}$=400 Hz.

In a third embodiment variant, the first exemplary embodiment and the second exemplary embodiment are advantageously combined by virtue of the fact that in the case of a small modulation factor, preferably in the case of a modulation factor of a=0.4, a changeover is made from the space vector modulation to the pulse pattern modulation for higher modulation factors a. This affords the advantage that the harmonic currents in the converter are reduced, such that the converter is subjected to lower loading. The combination of the two modulation methods results in a coverage of the entire modulation range with modulation methods which satisfy the requirement that in the intermediate frequency band ZFB no significant modulation products occur which, in interaction with the resonance magnification of the filter 1, lead to a functional impairment of the converter or of an operated electric motor. The intermediate frequency band ZFB can thereby be chosen such that high filter resonant frequencies $f_{res}$ are obtained for comparatively low pulse frequencies $f_{switch}$.

The invention is not restricted to the various exemplary embodiments in FIGS. 1 to 6b since the basic concept on which it is based can be applied to all converters, in particular with space vector modulation and/or pulse pattern modulation.

What is claimed is:

1. A converter comprising
a rectifier,
an intermediate circuit connected to the rectifier,
an inverter connected to the intermediate circuit, power semiconductor switches forming a part of the inverter, a drive circuit connected to the power semiconductor switches for modulating the power semiconductor switches, said drive circuit generating modulation products in a first frequency band, in a second frequency band and in an intermediate frequency band located between the first frequency band and the second frequency band, wherein the modulation products in the intermediate frequency band being of lesser magnitude compared to the modulation products in the first frequency band and in the second frequency band, and a filter forming a part of the inverter and connected between the power semiconductor switches and an electromotive drive, with the filter defining a resonance range, a passband for a fundamental frequency generated by the drive circuit, and an attenuation range, wherein the resonance range is located in a range of the intermediate frequency band.

2. The converter of claim 1, wherein the drive circuit is constructed to generate a space vector modulation or a pulse pattern modulation, or both.

3. The converter of claim 2, wherein the drive circuit is constructed to switch between the space vector modulation and the pulse pattern modulation depending on a modulation factor or the fundamental frequency, or both.

4. The converter claim 1, wherein the filter comprises a low-pass filter.

5. The converter claim 1, wherein the filter comprises a second-order LC low-pass filter.

6. A method for controlling a converter, the converter comprising a rectifier, an intermediate circuit connected to the rectifier, an inverter connected to the intermediate circuit, power semiconductor switches forming a part of the inverter, a filter connected between the power semiconductor switches and an electromotive drive, and a drive circuit connected to the power semiconductor switches, comprising the steps of:

modulating the power semiconductor switches with the drive circuit, generating with the drive circuit a fundamental frequency in a passband of the filter, and generating with the drive circuit modulation products in a first frequency band, in a second frequency band and in an intermediate frequency band located between the first frequency band and the second frequency band, wherein the modulation products in the intermediate frequency band have a reduced amplitude compared to the modulation products in the first frequency band and in the second frequency band, and wherein the intermediate frequency band is generated in a resonant frequency range of the filter located between the passband and an attenuation range of the filter.

7. The method of claim 6, wherein modulation of the power semiconductor switches comprises a space vector modulation or a pulse pattern modulation, or both.

8. The method of claim 7, wherein the pulse pattern modulation comprises different pulse patterns depending on a modulation factor or on the fundamental frequency, with each of the different pulse pattern generating frequencies located in the intermediate frequency band.

9. The method of claim 7, further comprising switching between the space vector modulation and the pulse pattern modulation depending on a modulation factor or the fundamental frequency, or both.

10. The method of claim 9, wherein switching between the space vector modulation and the pulse pattern modulation occurs at a modulation factor of about 0.3 to about 0.5.

* * * * *